United States Patent
Schweikert et al.

(10) Patent No.: US 9,528,625 B2
(45) Date of Patent: Dec. 27, 2016

(54) CURRENT DRIVING SYSTEM FOR A SOLENOID

(71) Applicant: Infineon Technologies AG, Neubiberg (DE)

(72) Inventors: Christian Schweikert, Munich (DE); Juergen Schaefer, Gruenwald (DE)

(73) Assignee: Infineon Technologies AG, Neubiberg (DE)

( * ) Notice: Subject to any disclaimer, the term of this patent is extended or adjusted under 35 U.S.C. 154(b) by 782 days.

(21) Appl. No.: 13/776,760

(22) Filed: Feb. 26, 2013

(65) Prior Publication Data

US 2014/0238494 A1    Aug. 28, 2014

(51) Int. Cl.
| F16K 31/06 | (2006.01) |
| H01F 7/06 | (2006.01) |
| F02D 41/20 | (2006.01) |
| F02D 41/28 | (2006.01) |

(52) U.S. Cl.
CPC ........... F16K 31/0648 (2013.01); F02D 41/20 (2013.01); F16K 31/0675 (2013.01); H01F 7/064 (2013.01); F02D 2041/2051 (2013.01); F02D 2041/2058 (2013.01); F02D 2041/2068 (2013.01); F02D 2041/286 (2013.01); Y10T 137/0318 (2015.04)

(58) Field of Classification Search
CPC .. F16K 31/0648; F16K 31/0675; H01F 7/064; Y10T 137/0318; F02D 41/20; F02D 2041/2051; F02D 2041/2058; F02D 2041/2068; F02D 2041/286
USPC ........................................................ 361/152
See application file for complete search history.

(56) References Cited

U.S. PATENT DOCUMENTS 5,280,773 A * 1/1994 Henkel ............... F02D 41/3827
                                                       123/300
2008/0088262 A1   4/2008  Bolz
2010/0268440 A1  10/2010  Reichinger et al.

FOREIGN PATENT DOCUMENTS

| CN | 1125494 A | 6/1996 | |
| CN | 101911324 A | 12/2010 | |
| DE | 102010022109 B3 * | 9/2011 | ............. F02D 41/20 |
| JP | S61277842 A | 12/1986 | |
| WO | 9500960 A1 | 1/1995 | |

(Continued)

OTHER PUBLICATIONS

Machine Translation of Roesel, German Patent Document DE 102010022109 B3, Sep. 2011.*

*Primary Examiner* — Thienvu Tran
*Assistant Examiner* — Kevin J Comber
(74) *Attorney, Agent, or Firm* — Shumaker & Sieffert, P.A.

(57) ABSTRACT

A current driving system for a solenoid valve is described herein. In an embodiment, the current driving system comprises a pre-driver to control a control input of a transistor coupled to an electrical input of a solenoid valve. The transistor inducts electric power into the solenoid valve when the transistor is switched on.

The current driving system further comprises a signal generator to produce a small signal and to output the small signal to the electrical input of the solenoid valve. The electric power being supplied by the small signal into the solenoid valve is substantially smaller than the electric power being supplied by the transistor when the transistor is switched on. The current driving system further comprises a measurement unit to measure a response to the small signal at the electrical input of the solenoid valve.

17 Claims, 8 Drawing Sheets

(56) References Cited

FOREIGN PATENT DOCUMENTS

WO 2009063047 A1 5/2009

* cited by examiner

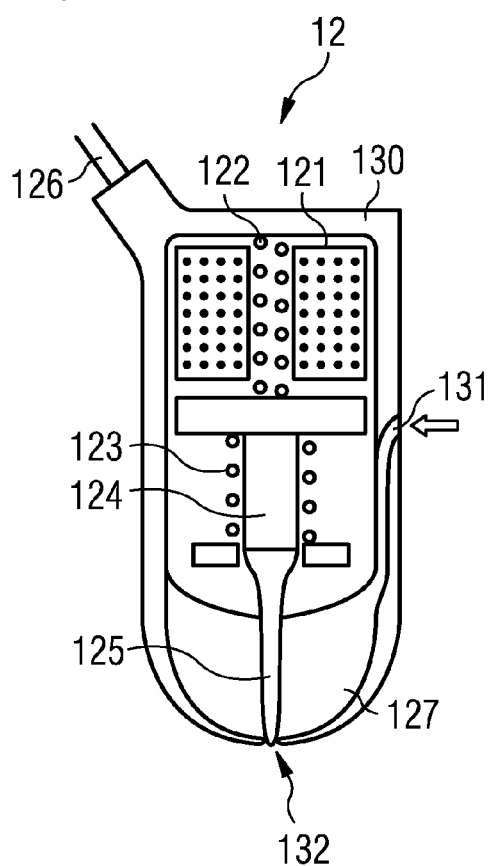
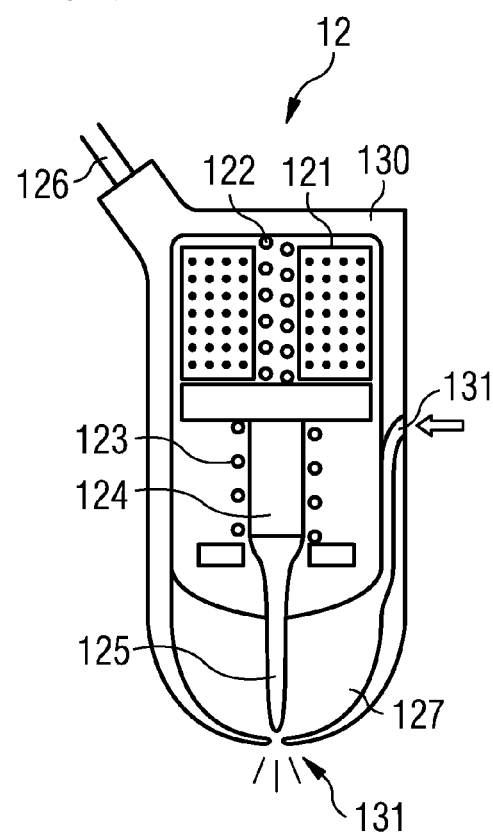

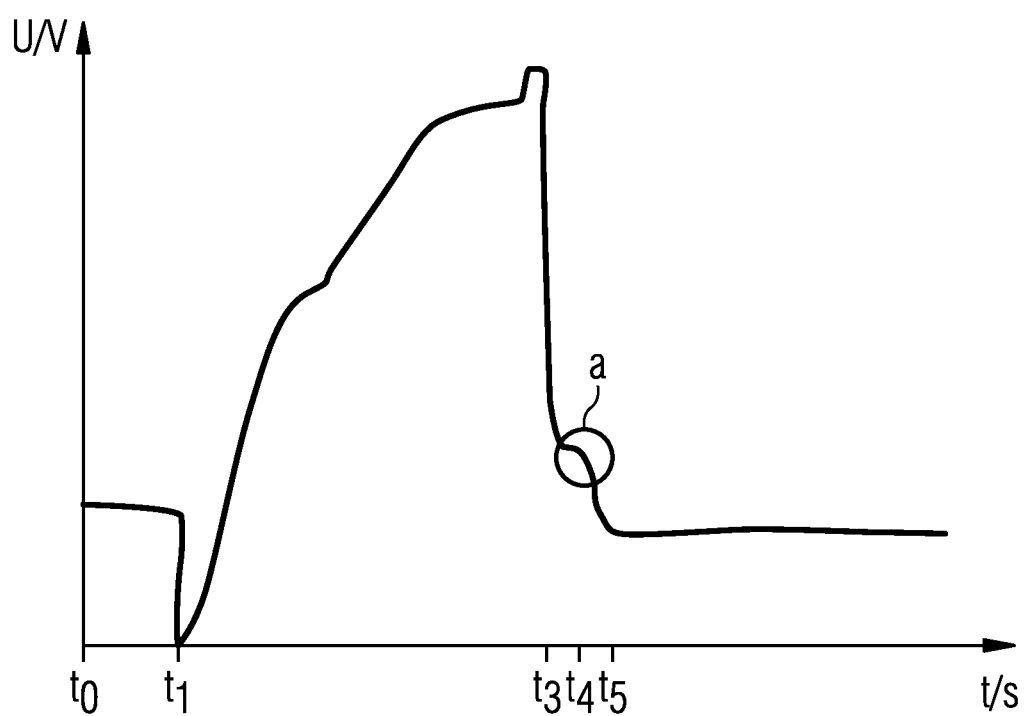

FIG 6
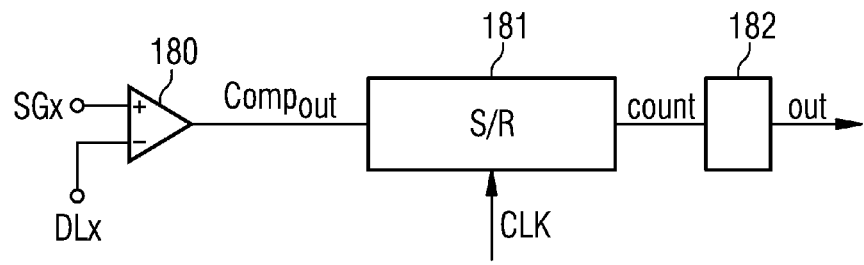
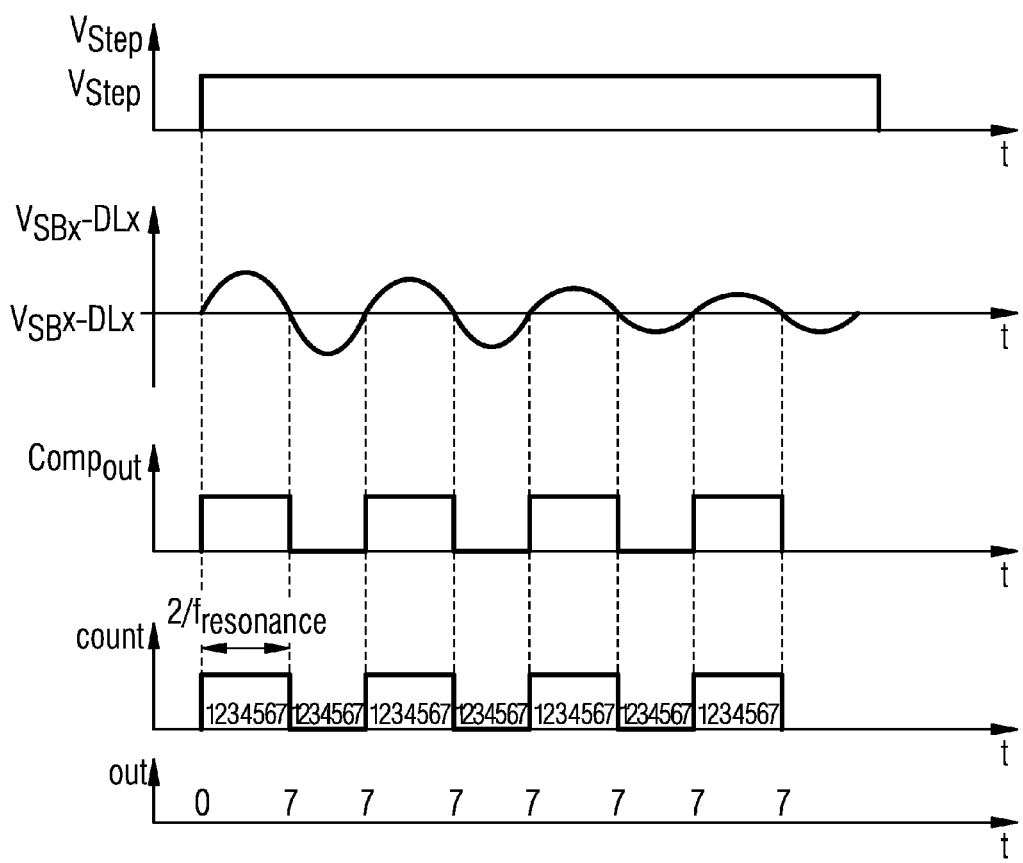

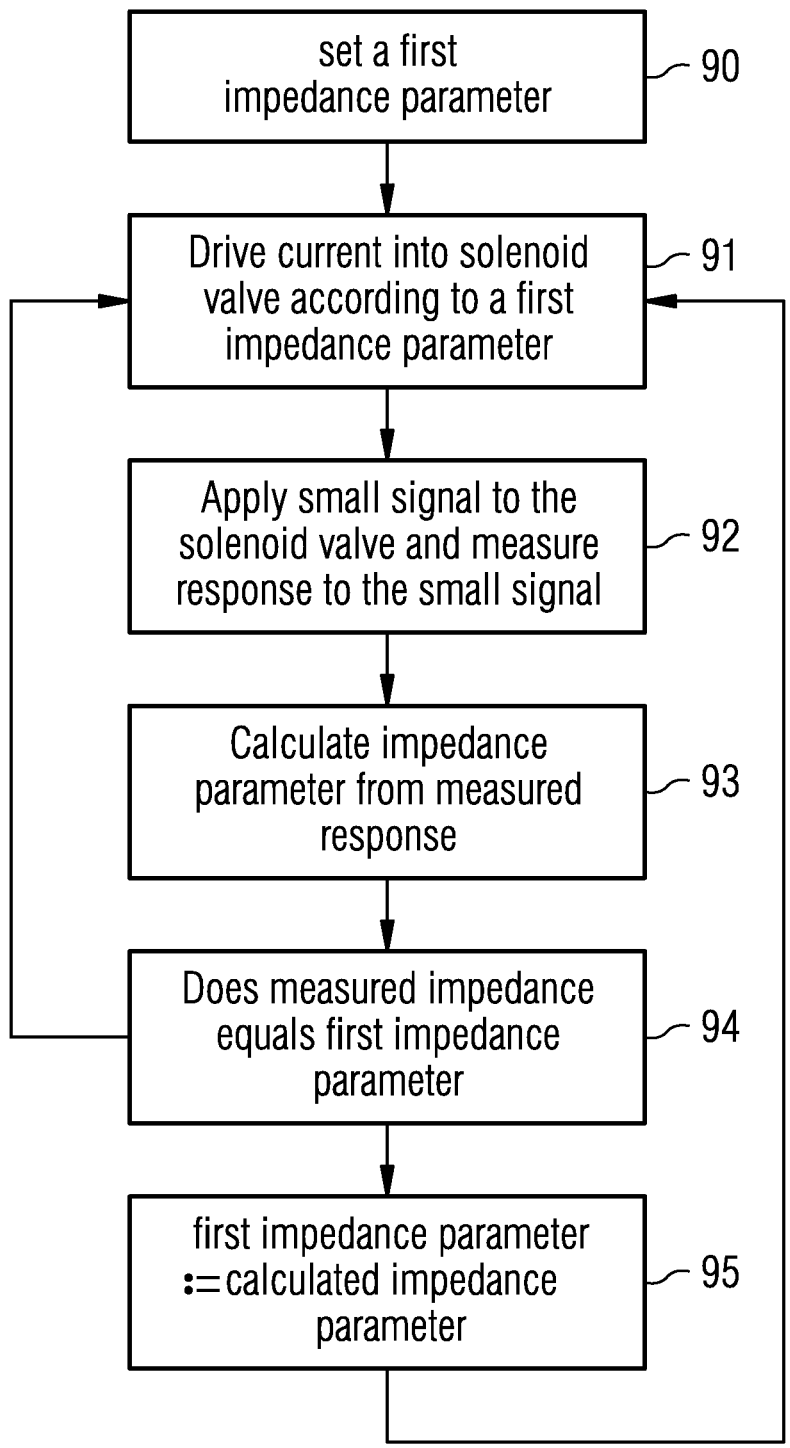

CURRENT DRIVING SYSTEM FOR A SOLENOID

BACKGROUND

In the field of combustion engines having solenoid valves, it may be advantageous for an efficient combustion to precisely time the current into a solenoid valve. Fluctuations of the parameters of the combustion engine like temperature, pressure and aging of the components may influence the timing. Therefore, there is a need for an accurate control of solenoid valves.

SUMMARY

In one example, a current driving system for a solenoid valve comprises a pre-driver to control a control input of a transistor coupled to an electrical input of a solenoid valve. The transistor inducts electric power into the solenoid valve when the transistor is switched on. The current driving system further comprises a signal generator to produce a small signal and to output the small signal to the electrical input of the solenoid valve. The electric power being supplied by the small signal into the solenoid valve is essentially smaller than the electric power being supplied by the transistor when the transistor is switched on. The current driving system further comprises a measurement unit to measure a response to the small signal at the electrical input of the solenoid valve.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict plural embodiments in accordance with the disclosure and are, therefore, not to be considered limiting of its scope, the disclosure will be described with additional specificity and detail through use of the accompanying drawings, in which:

FIG. 2 shows an embodiment of a solenoid valve in a closed state.

FIG. 3 shows the solenoid valve of FIG. 2 in an open state.

FIG. 4 shows a voltage profile at a solenoid valve when being driven.

FIG. 6 demonstrate the function of a small signal analysis used in the control signal shown in FIG. 5.

FIG. 9 is a flow chart of a method for controlling a solenoid valve according a second embodiment.

DETAILED DESCRIPTION

In the following detailed description, reference is made to the accompanying drawings, which are also part of the description. Unless otherwise noted, the description of successive drawings may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, may be arranged, substituted, combined, separated, and designed in a wide variety of different configurations.

Figure 1:
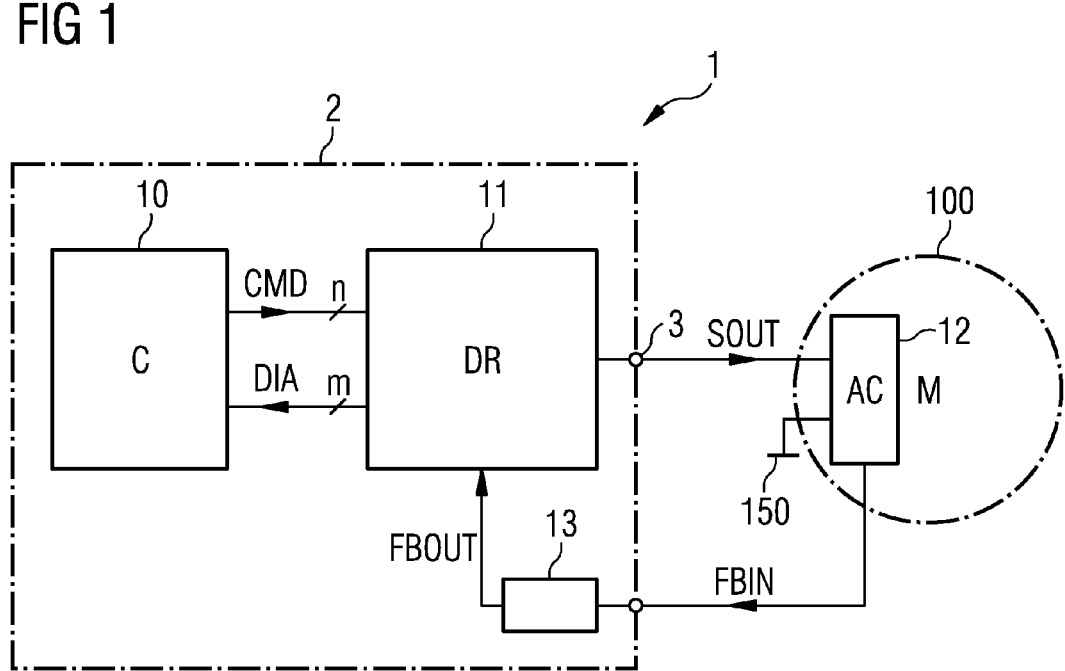
FIG. 1 shows a schematic representation of an embodiment comprising a solenoid valve and a current driving system for driving current into the solenoid valve.

FIG. 1 is a block diagram that depicts a module 1 comprising a solenoid valve 12, which is part of a combustion engine 100, and a current driving system 2 for driving current into the solenoid valve 12. The current driving system 2 comprises a control circuit 10, a driver circuit 11 and a feedback circuit 13. The control circuit 10 and the driver circuit 11 are coupled to one another via signal lines CMD and DIA. Signals that are driven via the signal lines CMD are output by the control circuit 10 and received by the driver circuit 11. In the opposite direction, signals that are transmitted through the signal lines DIA are driven by the driver circuit 11 and received by the control circuit 10. Further, the driver circuit 11 drives current through an output 3 of the current driving system 2 into the solenoid valve 12. In the present embodiment, the output 3 comprises only one output port for the current to the solenoid valve 12, while the current from the solenoid valve 12 flows into a ground connection 150 arranged outside of the current driving system 2. In an alternative embodiment, as it will be shown with reference to FIG. 5, the output 3 comprises two output ports, one for the current to the solenoid valve 12, one for the current from the solenoid valve 12.

A feedback signal FBIN is fed back from the solenoid valve 12 to the feedback circuit 13. In an embodiment, FBIN is proportional to the voltage at inputs of the solenoid valve 12. The feedback circuit 13 outputs a signal FBOUT to the driver circuit 11. The driver circuit 11 receives feedback information via the signal FBOUT for controlling the current flowing into the solenoid valve 12. The control circuit 10 outputs the CMD signals, which indicate to the driver circuit 11 to drive current through the output 3 based on the status of the CMD signals and based on the feedback signal FBOUT. The current, provided by the driver circuit 11, flows through the output 3 in the solenoid valve 12, which causes the solenoid valve to open such that fluid flows through the solenoid valve 12 to be injected into a combustion chamber of the combustion engine 100. The timing of the fluid flow may be important for ensuring an efficient combustion in the combustion engine 100.

In some embodiments, such as the embodiment shown in FIG. 1, the control circuit 10 is implemented as a microcontroller. According to such embodiments, control circuit 10 may be configured to execute one or more instructions in order to control the start and the end of an injection cycle via the CMD signals. The driver circuit 11 may comprise a regulator that regulates the current through the solenoid valve. The regulation may be based on a model that includes, among other parameters, a parameter for the solenoid valve's impedance. The inductive part of the solenoid valve's impedance may have a strong influence on a control algorithm because incorrect values for the inductance of the solenoid valve 12 may cause the injection of fluid to be either too early or too late, which may lead to less efficient combustion. Therefore, an accurate estimation or accurate measurement of a solenoid valve's impedance may help to make combustion more efficient.

In other examples, not shown here, the regulator may be implemented in the contro10l circuit based on instructions executable by a microcontroller. Such instructions may comprise a control algorithm based on one or more models of the solenoid valve 12.

The inductance of the solenoid valve 12 may change during its operation, especially when the flow of fluid through the solenoid valve 12 changes. The movement of a piston of the solenoid valve causes the fluid to apply a force back on the piston. This force may cause a change of the inductance of the valve. In other words, the impedance may not be stable during an injection cycle. Further, changes of other parameters like temperature and pressure may also change the inductance of the solenoid valve 12. The parameters of solenoid valves may also be conditioned by age which may lead to different efficiencies of the combustion engine depending on the age of the solenoid valves.

Further, the inductance of the solenoid valve 12 can give an indication for the flow of fluid. A change in the inductance of the actuator can be detected. This gives a direct feedback from the valve about when the solenoid valve 12 opens or closes. If the driver circuit 11 does not have the information that a valve is closed, the driving circuit should not give the command to re-open the valve. Thus, the earliest point in time, at which the valve may be re-opened, is unknown in this case. A predetermined wait time between the open-state and the closed-state may be inserted. However, this wait time may limit the function of the engine.

The signal FBIN may provide information about the current or the voltage at the solenoid valve 12. However, a more accurate control is possible if the control is based on further information that gives an indication about the current impedance of the solenoid valve.

According to the techniques of this disclosure, the current driving system 2 comprises means to measure parameters of the impedance of the solenoid valve 12 and means to transmit the respective measurement results to the control circuit 10. Details of this function will be explained with reference to FIG. 5.

FIG. 2 shows a schematic cross-section of an embodiment of a solenoid valve 12. The solenoid valve 12 comprises a housing 130, a coil 121, a first spring 122, a second spring 123, a magnetic armature 124, an input opening 131, an output opening 132, a needle 125, a reservoir 127 and electrical inputs 126. The first spring 122 extends between the upper part of the housing 130 and the magnetic armature 124. The housing 130 has two openings 131 and 132 which are also openings of the reservoir 127. The opening 131 is an input opening and the opening 132 is an output opening. The input opening 131 is connected to a fluid tank (not shown in FIG. 2), that comprises fluid such as gasoline. This fluid tank may be part of a common rail system in which fluid is stored under a high pressure, e.g., 1000 bar. The pressure causes fluid to be input into the reservoir 127 of the solenoid valve 12 such that the reservoir 127 is filled with fluid.

The electrical inputs 126 are connected to the ends of the wires of the coil 121. One of the electrical inputs 126 is connected to the output 3, shown in FIG. 1, and the other one of the electrical inputs 126 is connected to the ground connection 150, also shown in FIG. 1. FIG. 2 shows the solenoid valve 12 in a state in which no current is applied to the electrical inputs 126, such that no current flows through the coil 121. Thus, the magnetic flux in the solenoid valve 12 is zero. In this state, both the first spring 122 and the second spring 123 apply a force on the magnetic armature 124, the first spring 122 applying a force downwards and the second spring 123 applying a force upwards. As the first spring 122 is stronger than the second spring 123, the magnetic armature 124 is in a low position.

As the needle 125 is connected to the magnetic armature 124, the needle 125 is also forced to its low position. Thus, the needle 125 closes the output opening 132, such that no fluid leaves the reservoir 127 through the output opening 132.

FIG. 3 shows the solenoid valve 12 of FIG. 2 in an open state. Current is driven through the electrical inputs 126 into the coil 121, which magnetizes the surrounding of the coil 121. The magnetic field pulls the magnetic armature 123 upwards, such that the upward forces are larger than the downward forces on the magnetic armature 123. This causes the needle 125 to also move upwards, opening the output opening 132, such that fluid from the reservoir 127 leaves the solenoid valve 12 through the output opening 132 into a combustion chamber of the combustion engine 100 shown in FIG. 1.

FIG. 4 shows a voltage curve of the voltage between the electrical inputs 126, shown in FIGS. 2 and 3, over time. The voltage is a result of the current driven into the solenoid valve and of the impedance of the solenoid valve. Between the points in time t1 and t3, current is actively driven into the solenoid valve by the current driving system, increasing the voltage at the electrical inputs 126 of the solenoid valve. At t3, the current driving system becomes inactive such that no further current is supplied to the solenoid valve, causing the voltage to drop. At t4 (marked with the circle a), due to the movement of the magnetic armature, a reverse current causes the voltage to temporarily bounce back until the voltage falls again. In an embodiment of the solenoid valve, the inductance changes by substantially 15% during the course of an injection cycle. In an embodiment, the combustion cycle has a length of substantially 4 to 6 Milliseconds. In other embodiments, the inductance may change by more or less than 15%, and the combustion cycle may have a length of more or less than 4 to 6 milliseconds.

FIG. 4 demonstrates that there is a delay between the time t3, at which the current is switched off, until the time of the actual closing of the solenoid vale. This delay is due to the impedance of the inertia of the mechanical components in the solenoid valve. Determining the time t4 means determining when the solenoid valve closes. Providing this information to the driver circuit 11, shown in FIG. 1, enables an efficient timing of the combustion process.

Figure 5:
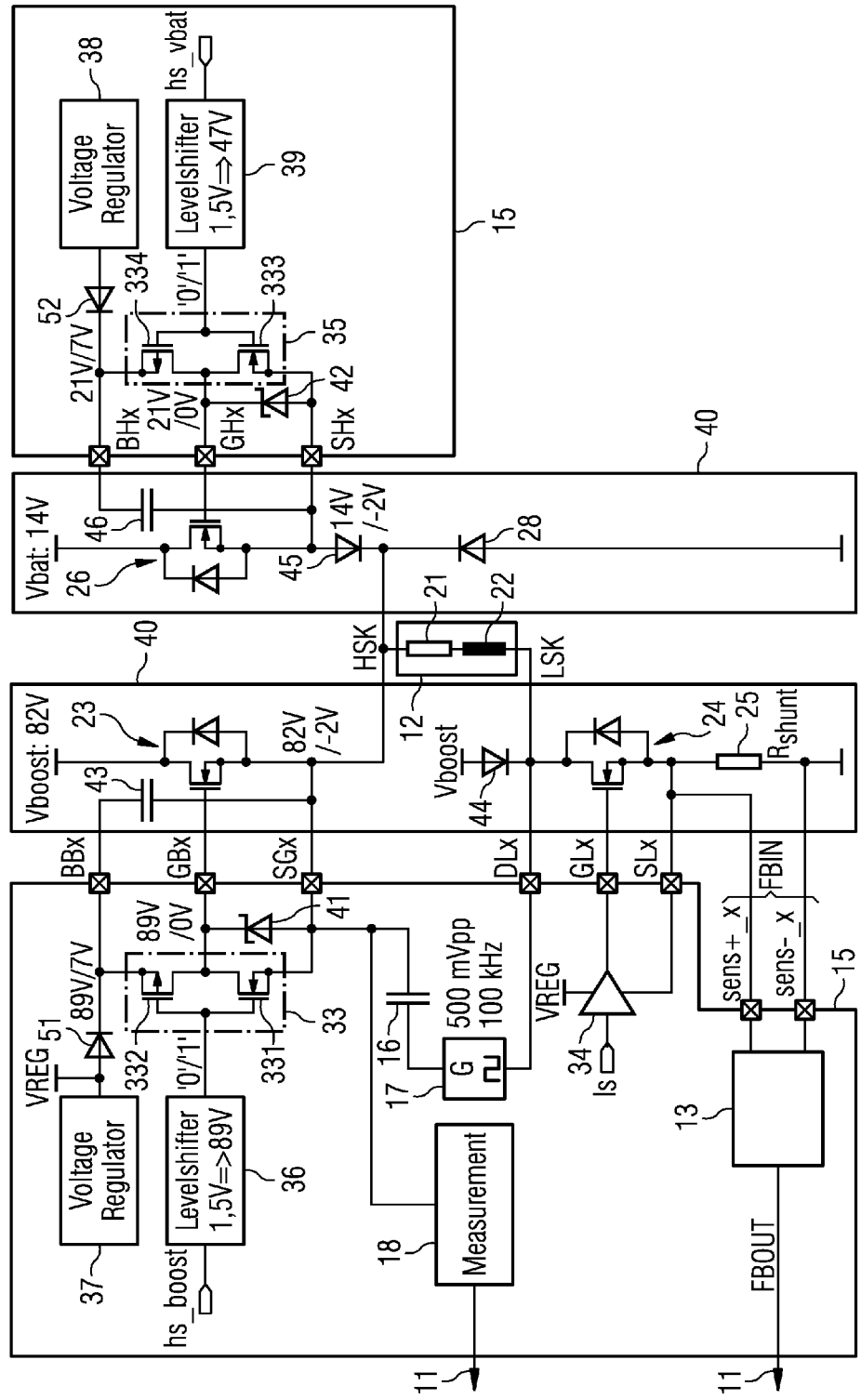
FIG. 5 shows an embodiment of a control circuit of the current driving system of FIG. 1.

FIG. 5 shows a schematic view of a pre-driver 15, an end-driver 40 and the solenoid valve 12. The pre-driver 15 and the end-driver 40 are part of the current driving system 12 shown in FIG. 1. In further embodiments, the current driving system does not comprise the end-driver, but the end-driver belongs to an entity separate from the current-driving system. In an embodiment, the pre-driver that is part of the current-driving system is a signal line to the end-driver.

The solenoid valve 12 is represented, in this embodiment, by a resistor 21 and an inductor 22 that are series connected. In an embodiment, the pre-driver 15 is integrated in an integrated circuit that is separate from the components of the end-driver 40, whereby the components of the end-driver 40 are implemented as discrete components.

In FIG. 5, the elements of the pre-driver 15 are depicted as two separate functional components. However, these two components may in some examples belong to the same integrated circuit, which may also include further elements of pre-driver 15 not shown in this Figure. In still other examples, the elements of pre-driver 15 may comprise separate components as shown in the example of FIG. 5.

The embodiment of a pre-driver 15 shown in FIG. 5 comprises a first voltage regulator 37 and a second voltage regulator 38, which each output a voltage of 7 volts (V). The pre-driver 15 further comprises a first level shifter 36, a second level shifter 39, a first rectifying diode 51, a second rectifying diode 52, a first high-side pre-driver 33, a second high-side pre-driver 35, a first zener diode 41, a second zener diode 42, a signal generator 17, a coupling device 16, a response measurement unit 18, a feedback circuit 13 and a low-side pre-driver 34. The pre-driver 15 comprises the outputs BBx, GBx, SGx, DHx, GHx, SHx. BHx and GHx and the inputs sens+_x and sens−_x.

The first voltage generator 37 is connected to the anode of the first rectifying diode 51, of which the cathode is connected the output BBx. The first voltage generator 37 generates a DC voltage VREG of 7V. The level shifter 36 receives a signal hs_boost and outputs a control signal to the first high-side pre-driver 33, the first high-side pre-driver 33 comprising a NMOS transistor 331 and a PMOS transistor 332. The gates of the transistors 331 and 332 are connected to the output of the level shifter 36. The transistors 331 and 332 are series connected such that the source of the transistor 332 is connected to the cathode of the first rectifying diode 51 and the source of the transistor 331 is connected the output SGx. Both the drains of the transistors 331 and 332 are connected to the output GBx. The first zener diode 41 is connected between the source and the drain of the transistor 331. An input of the response measurement unit 18 is connected to the output SGx.

The signal generator 17 outputs, if being switched on, a periodic rectangular signal that has a point-to-point voltage of 500 mV and a frequency of 100 kHz. The coupling device 16 is built as capacitor with two electrodes, a first of the electrodes being connected to a first output of the signal generator 17 and the second of the electrodes being connected to the output SGx. The second output for the signal generator 17 is connected to the output DLx. The signal generator 17 is, in this embodiment, constructed as to use the potential at the output DLx as reference potential and to change the potential at its first output to generate the periodic signal. The low side pre-driver 34 is constructed as an inverter that is supplied by the nodes VREG and SLx and that receives an input signal ls and has an output connected to the output GLx of the pre-driver 15.

The second voltage regulator 38 outputs a DC voltage of 7 V at its output that is connected to the anode of the second rectifying diode 52. The cathode of the second rectifying diode 52 is connected to the output BHx. The second level shifter 39 receives a signal hs_vbat and outputs a control signal to the second high-side pre-driver 35, the first high-side pre-driver 33 comprising a NMOS transistor 333 and a PMOS transistor 334. The gates of the transistors 333 and 334 are connected to the output of the second level shifter 39, the transistors are series connected such that the source of the transistor 334 is connected to the cathode of the second rectifying diode 52 and the source of the transistor 333 is connected the output SHx. The drains of the transistors 331 and 332 are connected to the output GHx.

The end-driver 40 comprises a first high-side switch 23, a second high-side switch 26 and a low-side switch 24, a shunt resistor 25, a first capacitor 43, a second capacitor 46, a first diode 28, a second diode 44 and a third diode 45. In this embodiment, the high-side switches are MOSFETs (metal-oxide-semiconductor field-effect transistors). However, in other embodiments, other transistors such as bipolar transistors (e.g., insulated-gate bipolar transistors (IGBTs)) may be used.

The first high-side switch 23 is constructed as power n-channel MOSFET with an integrated freewheeling diode. The gate of the first high-side 23 switch is connected to the output GBx of pre-driver 15, while its drain is connected to the supply node Vboost that provides a voltage supply of 82V. The source of the first high-side switch 23 is connected to the node HSK. The first capacitor 43 is coupled between the output BBx and the output SGx of the pre-driver 15.

The second high-side switch 26 is constructed as power n-channel MOSFET with an integrated freewheeling diode. The gate of the second high-side switch 26 is connected to the port GHx, while its drain is connected to the supply node Vbat that provides a vehicle battery voltage supply of 14V. The supply voltage may vary during operation of the vehicle and may increase to a voltage of 40V in the event of a load bump, which may be a sudden change in a load. The source of the second high-side switch 26 is connected to the port SHx. The second capacitor 46 is coupled between the output BHx and the output SHx of the pre-driver 15. The anode of the first diode 28 is connected to ground, and the cathode of the first diode 28 is connected to the node HSK. The anode of the third diode 45 is connected to the port SHx and the cathode is connected to the node HSK. The second capacitor 46 is coupled between the ports BHx and SHX. Accordingly, the second high-side switch and the first high-side switch are coupled to one of the electrical inputs of the solenoid valve.

The solenoid valve 12 has two ports, which are referenced as electrical connections in FIG. 2. One of these ports is connected to the node HSK, the other port is connected to the node LSK. The electric behavior of the solenoid valve 12 may be represented in FIG. 5 by a series connection of the resistor 21 and the inductor 22 between the two ports of the solenoid valve 12.

The low-side switch 24 is constructed as power n-channel MOSFET with an integrated freewheeling diode. The gate of the low-side switch 24 is connected to the port GLx and its drain is connected to the node LSK. The node LSK is also connected to the port DLx and the cathode of the second diode 44 of which the anode is connected to the voltage supply node Vboost. The shunt resistor 25 is connected between the output SLx of the pre-driver 15 and ground.

If the input signal hs_boost is low, the levelshifter 36 outputs a voltage of 0 V, causing the transistor 332 to conduct. This causes the voltage at voltage at the node GBx to go high, causing also the high-side switch 23 to conduct, which causes coupling of the voltage supply node Vboost to the node HSK.

When the signal hs_boost is high, the levelshifter 36 outputs a voltage of 89 V, switching transistor 331 on and transistor 332 off. Then, the voltage at the output GBx is on the same potential as the voltage at output SGx such that the first high-side switch 23 is turned off. The voltage at the node HSK drops and may even fall below 0 V, e.g. to −2V due to the induction of the solenoid valve. Accordingly, the voltage at the node HSK is between −2V and 89 V.

The output BBx is boosted by the first capacitor 43. When the voltage at the node HSk is at −2V, the output BBx is charged by the first voltage regulator 37 to 7V. When the first high-side driver 23 is switched on again the voltage at node HSK is brought to 82 V and the first capacitor 43 boosts the voltage at the output BBx to 89V. As the transistor 332 is supplied by node BBx, the first pre-driver 33 will drive the output GBx to 89V through the transistor 332.

If the signal hs_vbat is driven to a low voltage, the levelshifter 39 outputs a voltage of 0 V, such that the PMOS transistor 334 of the second high-side switch is switch on, causing the voltage at the port GHx to go to 21 V. As a result, the second high-side switch 26 is switched on such that to voltage at HSK reaches 14 V.

The output BHx is boosted by the second capacitor 46. When the voltage at the output BHx is a diode voltage below the internal voltage regulator 38, the output BHx is charged by the second voltage regulator 38 to 7V. When the second high-side driver 26 is switched on again, and the voltage at the output BHx is brought to 14 V, the second capacitor 46 boosts the voltage at the output BHx to 21V. This enables the second pre-driver 35 to drive the output GHx to 21V through the transistor 334.

Usually, when one of the high-side switches 23 and 26 is switched on, the low-side switch 24 is also switched on by applying a low voltage to the signal ls that causes the low-side pre-driver 34 to output a high voltage at the output GLx such that the low-side driver 24 conducts current.

The feedback circuit 13 receives two signals from the inputs sens+x and the input sens−x. The voltage difference between these inputs is a measure for the current flowing through the solenoid valve 12. The feedback circuit 13 measures the respective voltage difference and outputs its measurement result to the driver circuit 11, shown in FIG. 1, via the signal FBOUT. The feedback circuit 13 provides a first feedback path for providing a measurement value for a current through the solenoid valve 12. In a further embodiment, the first feedback path provides a measurement value of a voltage at inputs of the solenoid valve 12. The driver circuit 11 functions as a regulator to regulate the current through the solenoid valve 12.

The node HSK may be driven to 82V by the first high-side driver 23 to 82 V or to 14V by the second high-side driver 26 such that the voltage profile may comprise steps.

If the signal generator 17 is switched on, it outputs a periodic rectangular signal having a frequency of 100 kHz and a point-to-point amplitude of 500 mV. The coupling device couples this signal to the output SBx, thereby coupling a periodic voltage to the electrical potential at node HSK. The resulting electrical potential, especially the transient behavior at the node HSK, depends on the total impedance of the load being connected to the node HSK.

The signal generator 17 generates a small signal. The electric power that is supplied to the solenoid valve 12 equals the current through the solenoid valve 12 times the voltage between HSK and LSK. The electric power being supplied by the small signal into the solenoid valve is substantially smaller than the electric power being supplied by the transistor when the transistor is switched on. For example, the electric power supplied by the transistor into the solenoid valve when the transistor is switched on may be at least ten times larger than the electric power being supplied by the small signal into the solenoid valve. Thus, the solenoid valve is not opened. Instead, the solenoid valve remains substantially closed when the small signal is applied to the electrical input of the solenoid valve, such that the small signal may be applied during the time when the transistor 23 is off.

In the given example, electrical inputs are driven with voltage signals that vary between 0V and 82V. Thus, the amplitude is 82V which is large in comparison with the 0.5V amplitude of the small signal. In some examples, the amplitude of voltage at the electrical inputs of the solenoid valve is larger than 30 times the amplitude of the small signal. In this embodiment, the signal generator 17 is only switched on when the first high-side switch 23 and the second high-side switch 26 are switched off, such that the impedance of the load at node HSK is dominated by the impedance of the solenoid valve 12. The voltage curve strongly depends on the impedance of the solenoid valve and therefore on the inductive part of the impedance of the solenoid valve 12.

The frequency response to the coupled periodic signal is measured by the response measurement unit 18. The response measurement unit 18 may comprise a voltage measurement unit and a signal processor to calculate a Fourier transformation of the voltage signal at the output BSx. Further embodiments of the response measurement unit 18 will be explained with reference to following Figures. The response measurement unit 18 outputs a measurement value for the impedance of the solenoid valve 12.

The response measurement unit 18 provides a second feedback path to the regulator for providing a measurement value for the response to the coupled small signal.

The inductive behavior of the solenoid valve 12 is detected by detecting the AC-response of a resonance circuit with separate excitation, whereby the resonance circuit is represented by the inductance of the actuator. A change of the inductance may be detected by the resonance amplitude and the resonance phase. The time at which the inductance changes is the time of opening or closing the valve.

In an embodiment, the capacitance of the capacitor that forms the coupling device 16 is 100 pF, while the inductance of the solenoid valve 12 is in the range of 50 μH. The resonance frequency is expected to be in the range of 1 to 10 MHz, for example between 5 and 7 MHz. The voltage at the input of the response measurement unit 18 is, in an embodiment, sampled with a sampling frequency of 200 MHz, which provides sufficient oversampling.

In an embodiment, the pre-driver 15 may provide further functions like a slew rate control, pre-drivers for additional solenoid valves, a battery voltage monitor and test logic.

FIG. 6 shows details of an embodiment of the resonance measurement unit 18. The resonance measurement unit 18 comprises a comparator 180, a counter 181 and a peak-value estimator 182. The comparator 180 comprises an inverting input, which is connected to the output DLx of the pre-driver 15, and a non-inverting input that is connected to the output SGx of the pre-driver 15 as shown in FIG. 5.

The comparator 180 outputs a signal Compout, a binary signal that indicates if the voltage at the non-inverting input is higher or lower than the voltage at the inverting input of the comparator 180. The signal Compout is received by the counter 181 that also receives a clock signal clk. The counter increases a count value at for each new rising clock edge. Each time the signal Compout changes, the counter is set to one. Accordingly, the counter counts the number of clock cycles between signal changes of the signal Compout. The counter 181 outputs the count value to the peak value estimator 182, which outputs the highest count value as the signal "out". The frequency of response at output SGx equals the frequency of clk times "out" times 2.

The circuits schematically shown in FIG. 6 are an implementation that needs only a small number of components and is, accordingly, area efficient. In this embodiment, the signal generator generates a clock signal with a rising edge and a falling edge, the falling edge being 100 μs after the rising edge. The response comprises a sinusoidal wave having a an amplitude that decreases over time and a frequency in the range of Megahertz, e.g. 5 MHz.

In an embodiment, the counting frequency clk of the counter is 200 MHz, which provides sufficient oversampling. In an embodiment, the combustion injections are repeated with a frequency of 200 Hz, which corresponds to a period of 5 ms. The signal generator outputs a rectangular signal with a frequency of 100 kHz i.e., with a period of 10 μs. The frequency response is in the range of 5 Mhz, i.e., with a period of 200 ns. The signal is AD-converted in the counter 181 with a sampling frequency of 200 MHz respectively a clock period of 5 ns.

Figure 7:
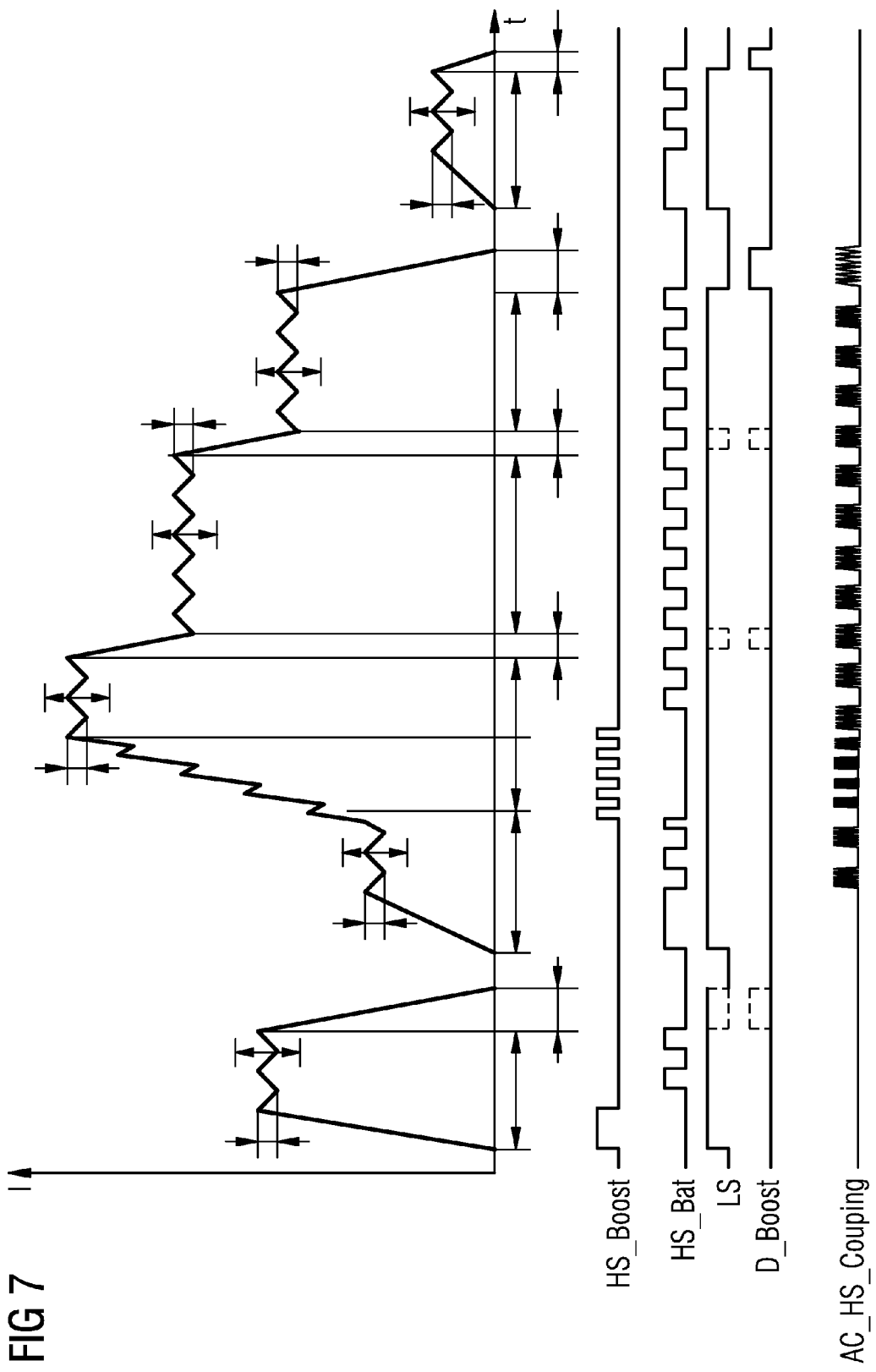
FIG. 7 shows a voltage profile at a solenoid valve during a combustion cycle.

FIG. 7 shows voltage and current curves at nodes of the circuit shown in FIG. 5 during a combustion cycle. The upper curve shows the current through the solenoid valve, the second curve the voltage of the signal hs_boost, the third one the signal hs_bat, the fourth curve the signal ls, the sixth one the voltage at the node d_boost, the seventh curve the voltage at node d_gnd and the lowest curve the voltage signal output by the signal generator. Driving the solenoid valve starts with pre-injections in which the low-side driver is on and in which the first high-side driver is switched on during a first pulse. The first pulse is followed by a second and a third pulse in which the second high-side switch is switched on. The pre-injections cause a medium current to flow into the solenoid valve.

The dashed lines in FIG. 7 indicate an option in which the low-side switch 24 is turned on earlier such freewheeling current flows not only through the diode 28 but also through the diode 44 such that the solenoid valve 12 closes faster.

After the pre-injections, the high-side switches and the low-side switch are switched off such that the current drops to zero.

Then, the main injections start with concurrently switching on the low-side driver and the second high-side driver. Then, the second high-side driver is switched off followed by two pulses during which the first high-side driver is switched on again. These pulses cause a small current to flow into the solenoid. After these pulses, the first high-side switch is activated with six pulses such that the current increases to a maximum level. After having reached the maximum level, the second high-side switch is switched on during eleven consecutive pulses. During theses pulses, the current drops to lower levels.

After the eleven pulses, the high-side switches and the low-side switch are switched off such that the voltage falls to zero again. The post-injections comprise the three pulses caused by the signal hs_bat such that a small current flows through the solenoid valve.

It should be mentioned that the embodiment of FIG. 7 shows one example of a post-injection period. The signal generator is also switched on during these post injections.

The sequence of pulses and the resulting current curve are based on a model of the solenoid valve and are considered to provide fuel injections that provide efficient combustion. To measure the inductance of the solenoid valve, periodic signals are generated by the signal generator. They are generated when, at the same time, none of the high-side switches are switched on, the low-side driver is switched on and the current value of inductance is of interest for the control circuit. This is especially the case during the main injections. Measuring the impedance values during between the high-side switch pulses, may provide feedback to the driver circuit during the main injections such that the driver circuit may receive feedback about the inductance of the solenoid valve to adapt the control of pulses.

For example, the sequence of signals hs_boost, hs_bat and ls is the standard sequence that is stored in the driver circuit for a solenoid valve that has standard parameters. In an example, a measurement shows that the inductance of the solenoid valve is larger than the standard inductance parameter. This may be interpreted to mean that the reaction of the solenoid valve is more inertial than according to the standard model. Thus, the number of pulses for the high-side pulses is reduced, but the length of each pulse is increased leading to an injection curve that has be determined to be efficient.

Figure 8:
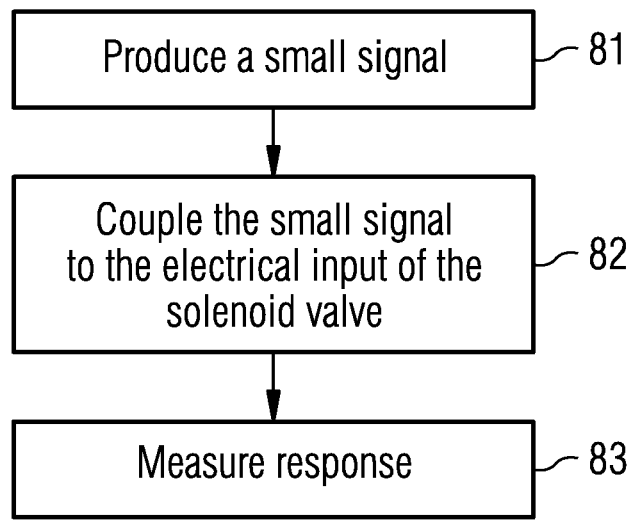
FIG. 8 is a flow chart of a method for controlling a solenoid valve according to a first embodiment.

FIG. 8 discloses a method for controlling a solenoid valve by a current driving system according to a first embodiment. The current driving system comprises a pre-driver to control a control input of a transistor, the transistor to be coupled to an electrical input of the solenoid valve. The method comprises the step of producing a small signal as step 81. At step 82, the small signal is output to the electrical input of the solenoid valve. Step 83 comprises measuring a response to the coupled small signal at the electrical input of the solenoid valve.

FIG. 9 shows a flow chart of a method for controlling a solenoid valve according to a second embodiment. The method starts with method step 90, in which a first impedance parameter is set. The first impedance parameter comprises a value for the inductance of the solenoid valve. This value may be derived from a set of standard inductance values derived from a model for a standard solenoid valve or may be derived from previous measurement of the solenoid valve built in the vehicle. In the following step 91, current is driven into the solenoid valve according to the first impedance parameter. Step 92 includes three sub-steps that correspond to the steps 81, 82, and 83. This means that a small signal is produced, the small signal is coupled to the electrical input of the solenoid valve and a response to the coupled small signal at the electrical input of the solenoid valve is measured. Step 92 may be applied after, during or alternating with step 91. Step 92 is followed by step 93, in which the impedance parameter is calculated from the measured response. The impedance parameter also contains a value for the inductance. In the following step 94, it is determined if the measured impedance equals the first impedance parameter. If this is the case, the method continues with step 91, otherwise the method proceeds with step 95, in which the first impedance parameter is overwritten by measured impedance parameter. Then, the method continues with step 91.

The measured impedance parameter is transmitted to the driver circuit 11 which, in a first embodiment, determines the point in time at which the valve closes or will close to timely send commands to the end-driver to drive current into the valve again. Timely driving the valve leads to less wait time between combustion cycles and therefore to a more efficient combustion. In a second embodiment, the driver circuit determines that the impedance parameter has permanently lower values than expected. The driver circuit 11 sends changes the current profile to compensate for the changed impedance parameters. The method according to the second embodiments provides a self-calibration of the driver circuit 11 of the solenoid valve.

The method enables a compensation of impedances changes, especially inductance changes, of the solenoid valve. An embodiment may be summarized as follows: the AC (alternating current) measurement is only used when the coil of the injector is not energized and the high-side driving MOSFETs are switched and no freewheeling diode conducts. The oscillator will be activated every 10 μs with voltage steps of 500 mV. The Oscillator circuit will respond with a damped sinusoidal oscillation, whereby the response frequency is linked to the anchor position according to the following relationship:

$$\omega_0 = 1/\sqrt{L_{injector}C}$$

$$L_{injector} = f(\text{anchor position})$$

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), microprocessors, microcontrollers, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for performing the functions described herein. Also, the techniques could be fully implemented in one or more circuits or logic elements.

Various components, modules, or units are described in this disclosure to emphasize functional aspects of devices configured to perform the disclosed techniques, but do not necessarily require realization by different hardware units. Rather, as described above, various units may be combined in hardware unit or provided by a collection of interoperative hardware units, including one or more processors as described above, in conjunction with suitable software and/or firmware. Various examples been described. These and other examples are within the scope of the following claims.

The invention claimed is:

1. A current driving system for a solenoid valve, comprising:
   a pre-driver to control a control input of a transistor coupled to an electrical input of a solenoid valve, wherein the transistor supplies electric power to the solenoid valve when the transistor is switched on;
   a signal generator to generate a small signal and to output the small signal to the electrical input of the solenoid valve, wherein an amount of electric power of the small signal input to the solenoid valve is substantially smaller than an amount of the electric power supplied by the transistor to the solenoid valve when the transistor is switched on;
   a capacitor comprising a first electrode and a second electrode, wherein the first electrode is connected to an output of the signal generator, and wherein the second electrode is connected to the electrical input of the solenoid valve; and
   a measurement unit to measure a response to the small signal.

2. The current driving system of claim 1, wherein the small signal is a periodic signal.

3. The current driving system of claim 1, wherein no small signal is coupled to the electrical input of the solenoid valve during the time in which the transistor drives current into the solenoid valve.

4. The current driving system of claim 1, wherein the measurement unit measures a frequency response at the electrical input.

5. The current driving system of claim 4, wherein the frequency response is within a range of substantially between 1 and 10 MHz.

6. The current driving system of claim 1, wherein the measurement unit comprises:
   a comparator; and
   a counter coupled downstream of an output of the comparator.

7. The current driving system of claim 1, wherein the pre-driver, the signal generator and the measurement unit are monolithically integrated in an integrated circuit.

8. The current driving system of claim 1, wherein the electric power supplied by the transistor to the solenoid valve when the transistor is switched on is at least ten times larger than the electric power being supplied by the small signal into the solenoid valve.

9. The current driving circuit according to claim 1, whereby no small signal is coupled to the output during the time in which the transistor drives current into the solenoid valve.

10. The current driving system of claim 1, further comprising:
   a regulator for regulating the current through the solenoid valve by controlling the pre-driver;
   a first feedback path to the regulator for providing a measurement of one or more of a voltage at the electrical input of the solenoid valve and a current through the solenoid valve; and
   a second feedback path to the regulator for providing a measurement of the response to the small signal.

11. The current driving circuit according to claim 10, wherein the regulator bases the regulation on an impedance value of the solenoid valve, wherein the impedance value is based on the measured response to the small signal.

12. The current driving circuit according to claim 1, whereby the small signal has a frequency in the range of 5 to 10 MHz.

13. The current driving circuit according to claim 1, whereby the measurement unit comprises a sampling unit for sampling the response with sampling frequency between 100 and 200 MHz.

14. The current driving circuit according to claim 1, whereby the measurement unit comprises a zero crossing detection unit.

15. A method for controlling a solenoid valve, comprising:
   generating, by a signal generator, a small signal;
   outputting, by the signal generator and via a capacitor, the small signal to an electrical input of the solenoid valve, wherein a first electrode of the capacitor is coupled to the signal generator and a second electrode of the capacitor is coupled to the electrical input of the solenoid valve;
   measuring, using a measurement unit, a response to the coupled small signal at the electrical input of the solenoid valve.

16. The method of claim 15, wherein generating the small signal comprises generating a periodic signal.

17. The method of claim 15, further comprising:
   not coupling any small signal to the electrical input of the solenoid valve during a time in which a transistor drives current into the solenoid valve.

* * * * *